United States Patent
Pedersen (12)

(10) Patent No.: US 6,249,149 B1
(45) Date of Patent: *Jun. 19, 2001

(54) APPARATUS AND METHOD FOR CENTRALIZED GENERATION OF AN ENABLED CLOCK SIGNAL FOR A LOGIC ARRAY BLOCK OF A PROGRAMMABLE LOGIC DEVICE

(75) Inventor: Bruce Pedersen, San Jose, CA (US)

(73) Assignee: Altera Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,682

(22) Filed: Jan. 23, 1998

Related U.S. Application Data

(60) Provisional application No. 60/037,751, filed on Jan. 23, 1997.

(51) Int. Cl.$^7$ .................................................. H03K 19/00
(52) U.S. Cl. .............................. 326/93; 326/39; 326/40; 326/41; 327/291
(58) Field of Search .............................. 326/39–41, 47, 326/93, 101; 327/291, 299

(56) References Cited

U.S. PATENT DOCUMENTS

| | | | |
|---|---|---|---|
| 5,652,529 | * 7/1997 | Gould et al. | 326/39 |
| 5,652,536 | * 7/1997 | Nookala et al. | 326/93 |
| 5,809,281 | * 9/1998 | Steele et al. | 326/39 |
| 5,811,987 | * 9/1998 | Ashmore, Jr. et al. | 326/39 |

OTHER PUBLICATIONS

"Quad D–Type Flip–Flop with Clock Enable", Advanced CMOS Logic Designer's Handbook, Texas Instruments (1987) pp. 2–469 and 2–470.

\* cited by examiner

*Primary Examiner*—Michael Tokar
*Assistant Examiner*—Steven S. Paik
(74) *Attorney, Agent, or Firm*—Pennie & Edmonds LLP

(57) ABSTRACT

A logic array block of a programmable logic device includes a clock generation circuit. The clock generation circuit has an input node to receive a clock signal, an enable signal input node to receive an enable signal, a clock generation circuit output node, and a digital logic circuit connected between the clock generation circuit input node, the enable signal input node, and the clock generation circuit output node. The digital logic circuit generates an enabled clock signal on the clock generation circuit output node in response to the clock signal and the enable signal when the enable signal has been asserted during a previous clock state of the clock signal. A set of logic elements, each of which includes a logic element clock input node, is connected to the clock generation circuit output node such that each logic element of the set of logic elements receives the enabled clock signal from the clock generation circuit.

19 Claims, 8 Drawing Sheets

APPARATUS AND METHOD FOR CENTRALIZED GENERATION OF AN ENABLED CLOCK SIGNAL FOR A LOGIC ARRAY BLOCK OF A PROGRAMMABLE LOGIC DEVICE

This application claims priority to the provisional application entitled "Apparatus and Method for Centralized Generation of an Enabled Clock Signal for a Logic Array Block of a Programmable Logic Device", filed Jan. 23, 1997, Serial No. 60/037,751.

BRIEF DESCRIPTION OF THE INVENTION

This invention relates generally to programmable logic devices that utilize logic array blocks. More particularly, this invention relates to a technique for generating a centralized enabled clock signal that can be used throughout a logic array block.

BACKGROUND OF THE INVENTION

FIG. 1 illustrates a programmable logic device 20 in accordance with the prior art. The programmable logic device 20 includes a set of logic array blocks 22. Row interconnect circuitry 24 and column interconnect circuitry 26 link the various logic array blocks 22. Input/output elements 28 positioned at the ends of the row interconnect circuitry 24 and column interconnect circuitry 26 are used for standard input/output operations.

FIG. 2 is a more detailed representation of a logic array block 22 in accordance with the prior art. The logic array block 22 includes a logic element stack 30, comprising a set of individual logic elements 31A–31H. A logic array block local interconnect circuit 32 routes signals into the logic elements 31. Column-to-row interconnect lines 34 and column-to-row interconnect logic 36 is used to route output signals from the logic elements 31 to the same or other logical array blocks 22.

FIG. 3 is a more detailed illustration of a prior art logic element 31. The logic element 31 includes a look-up table 40, which receives a set of data input signals. The look-up table 40 is programmed to implement a set of logic that is executed on the input signals. An output signal of the look-up table 40 is eventually routed to a register 42. The output signal is driven out of the register 42 in response to a clock signal from a clock control logic circuit 44. The clock control logic circuit 44 receives a set of input signals. Some of the signals are processed by a clear/preset logic circuit 46, while the other signals are processed by a clock selection multiplexer 48. The clock selection multiplexer 48 allows the register 42 to be driven by different clock signals. The output of the clock selection multiplexer 48 drives only a single register 42.

The clock control logic 44 is programmed into each logic element 31. Thus, in the logic element stack 30 of FIG. 2, clock generation circuitry is redundantly reproduced for eight logic elements 31. If this redundant circuitry could be reduced or eliminated, die space and processing costs could be reduced. In addition, inputs to the logic element may be used for combinatorial logic, instead of clock generation operations. Accordingly, it would be highly desirable to provide, from a single circuit, an enabled clock signal for application to all logic element registers within a logic array block of a programmable logic device.

SUMMARY OF THE INVENTION

A logic array block of a programmable logic device includes a clock generation circuit. The clock generation circuit has an input node to receive a clock signal, an enable signal input node to receive an enable signal, a clock generation circuit output node, and a digital logic circuit connected between the clock generation circuit input node, the enable signal input node, and the clock generation circuit output node. The digital logic circuit generates an enabled clock signal on the clock generation circuit output node in response to the clock signal and the enable signal when the enable signal has been asserted during a previous clock state of the clock signal. A set of logic elements, each of which includes a logic element clock input node, is connected to the clock generation circuit output node such that each logic element of the set of logic elements receives the enabled clock signal from the clock generation circuit.

The clock generation circuit provides a logic array block-wide enabled clock signal for each logic element. Thus, unlike the prior art, which locally generates an enabled clock signal at each logic element, the present invention relies upon a single clock generation circuit to provide the same signal to all logic elements. Accordingly, it can be appreciated that the present invention reduces die space and processing costs. Further, the circuit of the invention allows additional input lines to a logic element to be used for combinatorial logic, instead of clock generation operations.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
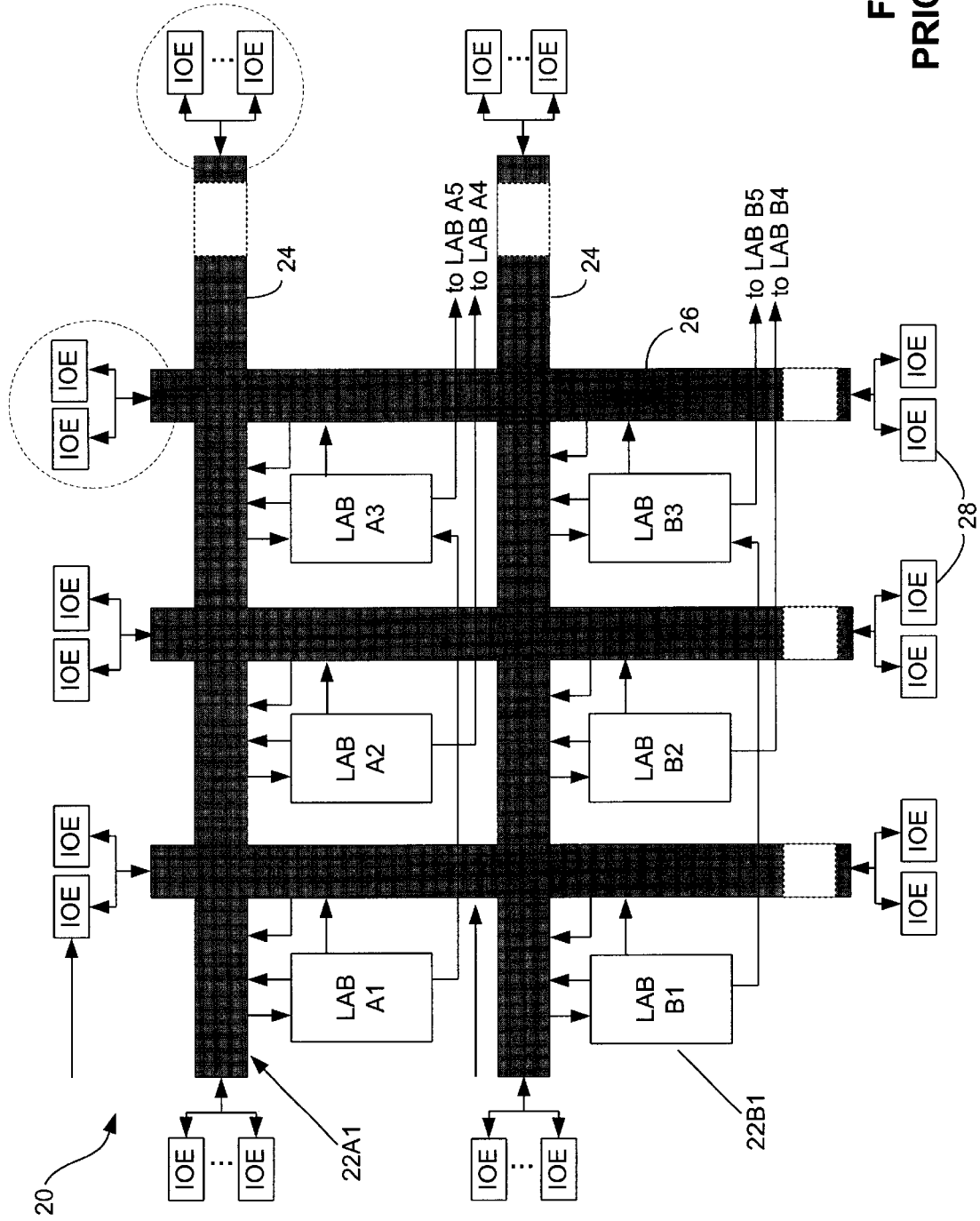
FIG. 1 illustrates a programmable logic device in accordance with the prior art.
Figure 2:
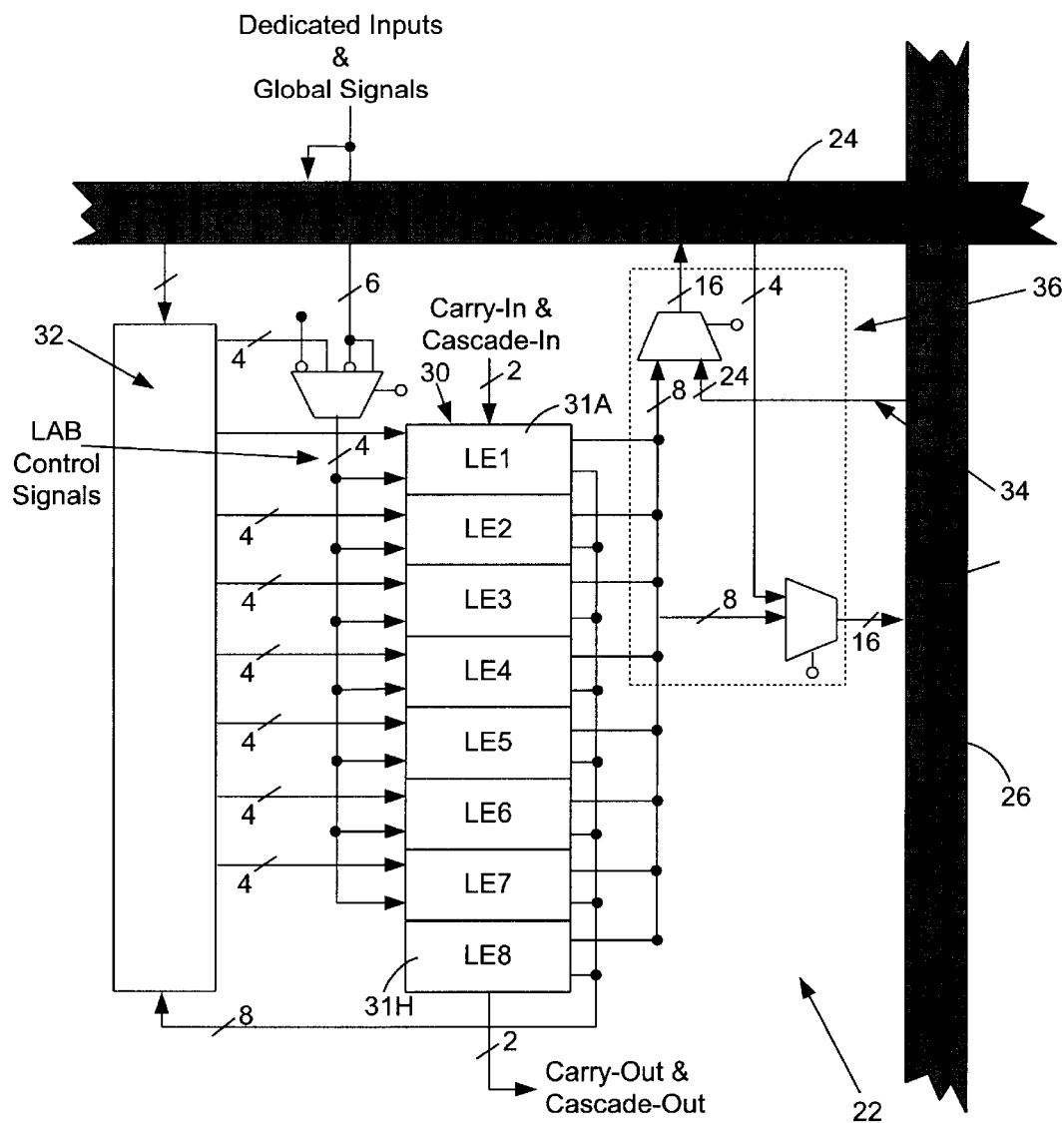
FIG. 2 illustrates a logic array block of the programmable logic device of FIG. 1.
Figure 3:
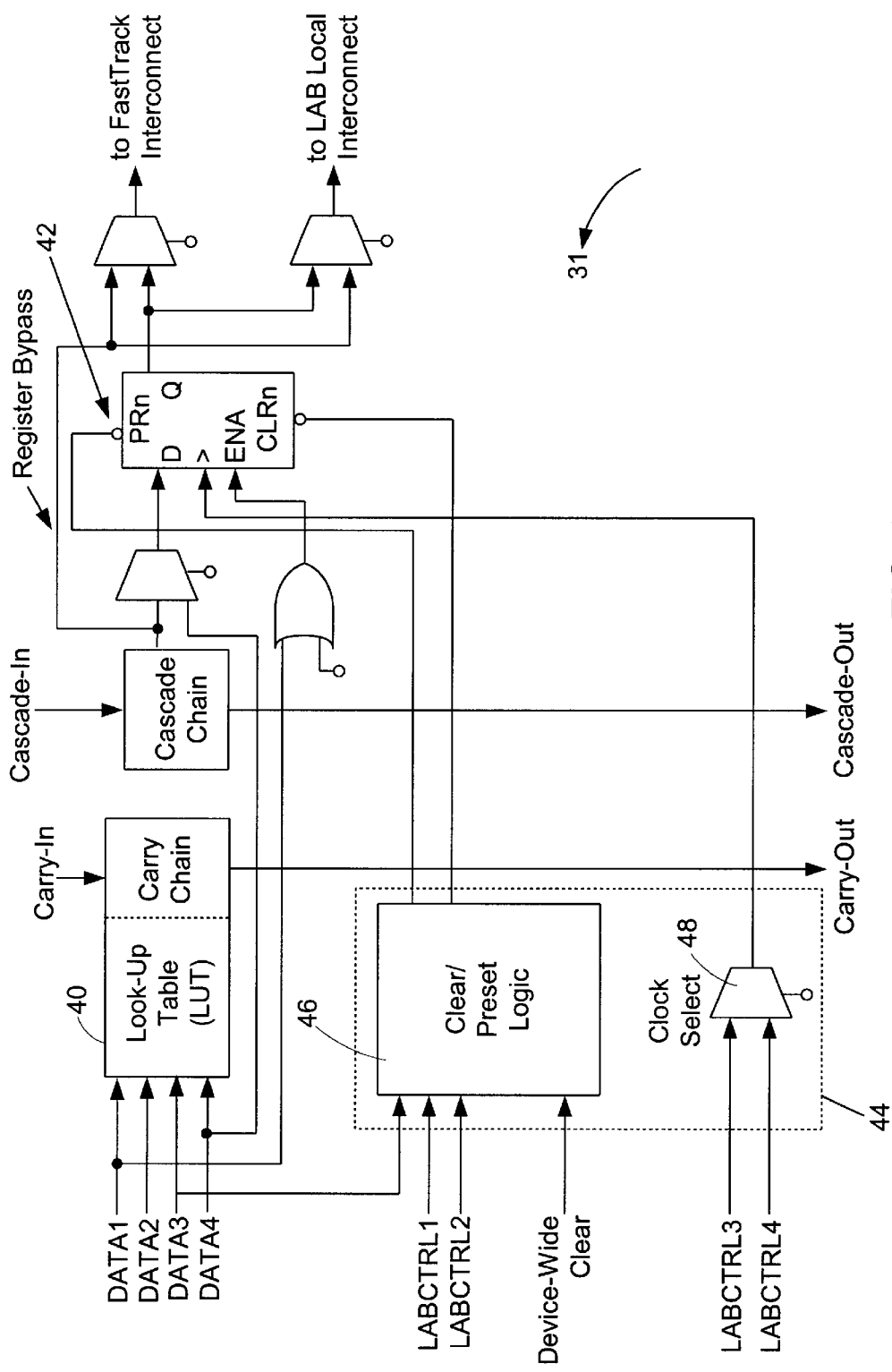
FIG. 3 illustrates a logic element of the logic array block of FIG. 2.
Figure 4:
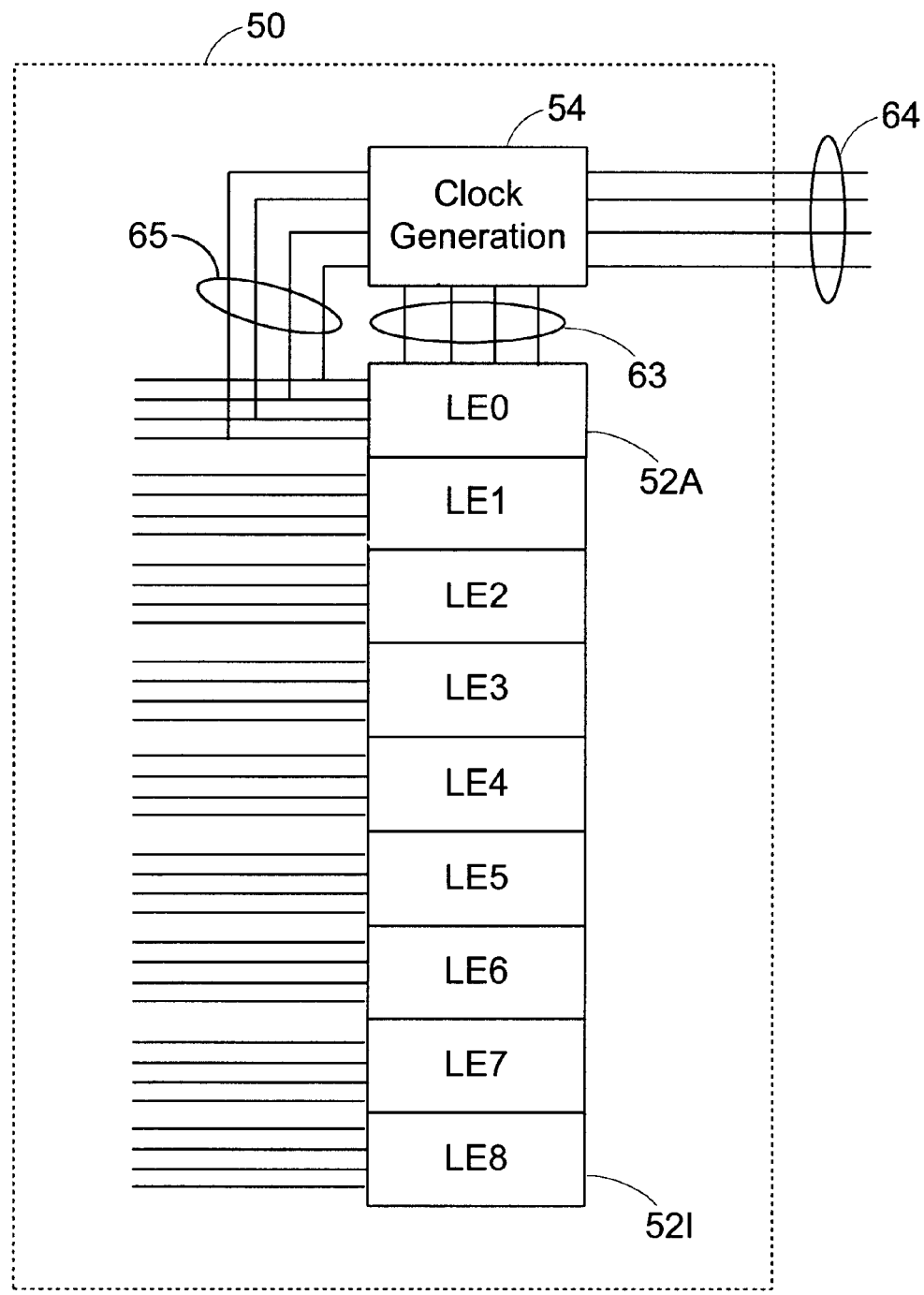
FIG. 4 illustrates a logic element stack in accordance with an embodiment of the invention.

FIG. 4 illustrates a logic element stack 50 in accordance with an embodiment of the invention. The logic element stack 50 may be substituted for the logic element stack 30 of FIG. 2. Thus, the logic element stack 50 forms a portion of a logic array block 22, which forms a portion of a programmable logic device 20.

The logic element stack 50 includes a set of logic elements 52A–52I and a logic array block clock generation circuit 54. The logic array block clock generation circuit 54 provides a logic array block-wide enabled clock signal for each logic element 52. Thus, unlike the prior art, which locally generates an enabled clock signal at each logic element, the present invention relies upon a single clock generation circuit 54 to provide the same signal to all logic elements 52. Accordingly, it can be appreciated that the present invention reduces die space and processing costs.

Figure 5:
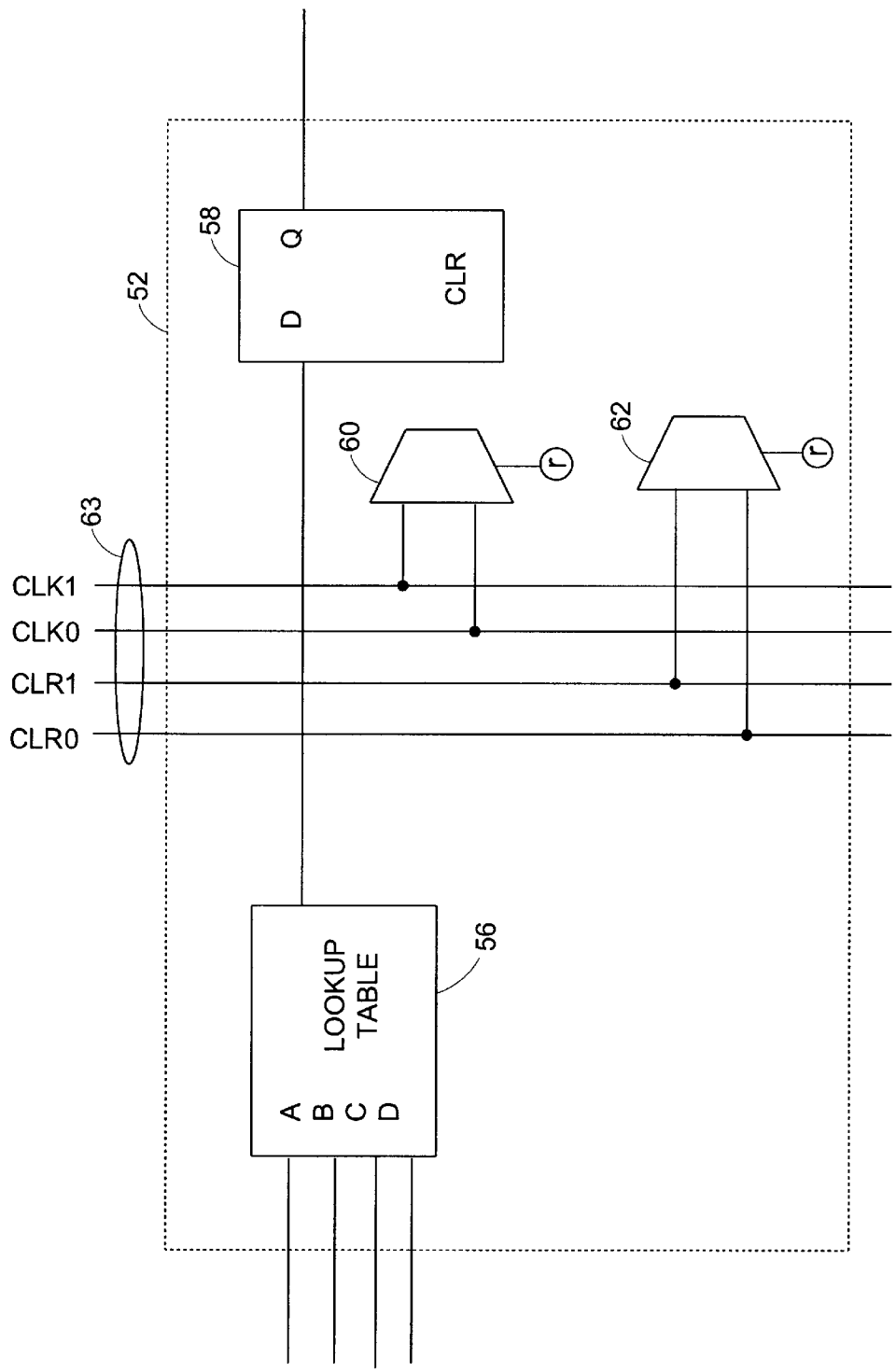
FIG. 5 illustrates a logic element in accordance with an embodiment of the invention.

FIG. 5 illustrates a logic element 52 in accordance with an embodiment of the invention. The logic element 52 includes a look-up table 56 and a register 58, implemented as a D-Q flip-flop. The logic element 52 also includes a clock multiplexer 60 and a clear signal multiplexer 62. The inputs to the multiplexers 60 and 62 are received from clock generation circuit output lines 63. FIG. 4 illustrates the clock generation circuit output lines 63 leaving the logic array block clock generation circuit 54 and being applied to the logic element 52A. The clock generation circuit output lines 63 are similarly applied to each logic element 52 in the logic element stack 50.

Figure 6:
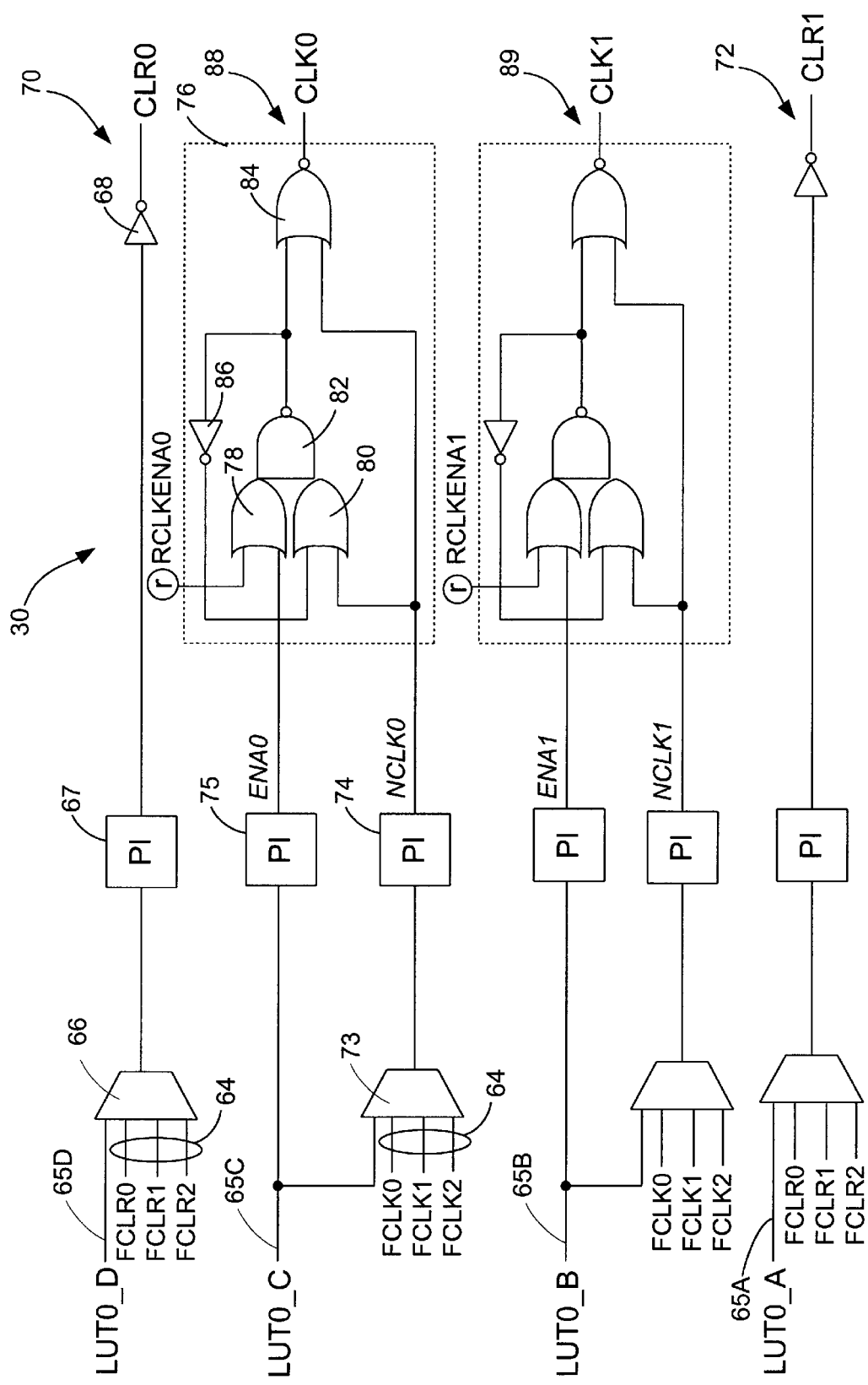
FIG. 6 illustrates a logic array block clock generation circuit in accordance with an embodiment of the invention.

FIG. 6 illustrates an embodiment of a logic array block clock generation circuit 54 in accordance with an embodiment of the invention. Note in FIG. 4 that the clock generation circuit 54 has a set of clock input signal lines (nodes) 64. Returning to FIG. 6, the same clock input signal lines (nodes) 64 are linked to a multiplexer 66. As shown in FIG. 6, the clock input signal lines 64 carry three register clear signals (FCLR0, FCLR1, and FCLR2). The multiplexer 66 also receives a look-up table input signal (LUTO_D) on line 65D. Alternately, an input signal that is not routed to a look-up table may be used as an input signal.

Returning to FIG. 4, it is illustrated that the clock generation circuit 54 receives a set of input signals on lines (nodes) 65. In particular, lines 65 carry the look-up table input signals routed to the look-up table 56 of the logic element 52A.

The output of multiplexer 66 is applied to a RAM bit programmable inverter 67 and is subsequently passed to an inverter 68, the output of which is a clear signal (CLR0). The multiplexer 66, programmable inverter 67, and inverter 68 constitute a clear signal processing circuit 70. The multiplexer 66 operates to select a variety of signals that can be used as a clear signal, which can ultimately be selected by the multiplexer 62 of FIG. 5. The clock generation circuit 54 includes a similar clear signal processing circuit 72. The circuit 72 is the same as the circuit 70, except that it receives a different look-up table input signal from line 65A.

The processing of the clear signals in the clock generation circuit 54 is relatively straight forward. The invention allows a variety of clear signals to be applied to each logic element 52 of a logic element stack 50.

Attention presently turns to the processing of clock signals in the clock generation circuit 54. FIG. 6 illustrates that a set of clock signals (FCLK0, FCLK1, and FCLK2) are applied to a multiplexer 73. Similarly, a look-up table input signal from line 65C is applied to the same multiplexer 73. The look-up table input signal from line 65C may be a clock signal that has been routed through local interconnect circuitry. As described below, the look-up table input signal can operate as a synchronous clock enable signal. The look-up table input signal can be substituted with another signal that is not applied to a look-up table, but is a dedicated signal to the clock generation circuit 54. The output of the multiplexer 74 is preferably selected with RAM bit signals (not shown).

The look-up table input signal is also applied to a programmable inverter 75 to generate a first enable signal ENAO. The output of the multiplexer 73 is applied to a programmable inverter 74 to generate a clock signal NCLKO. The output of the multiplexer 73 is referred to as an original input clock signal, while the output of the programmable inverter 74 is referred to as an inverted input clock signal.

The first enable signal ENAO, a second (supplemental) enable signal RCKLENAO, and the inverted input clock signal NCLKO are each applied to a clock latch circuit 76, which generates an output clock signal CLKO. Generally, the clock latch circuit 76 is configured such that it always produces a digital low output clock signal CLKO in response to a digital low original input clock signal (digital high inverted input clock signal). Further, the clock latch circuit 76 is configured such that it only produces an enabled digital high output clock signal CLKO when the enable signal ENAO is asserted during a previous clock cycle. That is, a rising transition of the clock enable signal ENAO will not produce a rising transition on the output clock. The output clock will only turn to a digital high value with the next digital high value of the original input clock signal (digital low inverted input clock signal). An implementation to achieve this functionality is disclosed in reference to FIG. 6 and is discussed in detail below.

An implementation of the clock latch circuit 76 includes a set of logical NOR gates 78 and 80, a logical NAND gate 82, a logical NOR gate 84, and an inverter 86. Initially considering logical NOR gate 84, it can be appreciated that an original input clock signal with a digital low value results in an inverted input clock signal with a digital high value. A digital high input value to a logical NOR gate insures that the output of the NOR gate will be a digital low value. Thus, the clock latch circuit 76 will always produce a digital low output clock signal in response to a digital low original input clock signal.

A digital high original input clock signal will only produce a digital high output clock signal if the enable signal was asserted during a previous clock cycle. That is, a rising transition on the clock enable signal will not produce a rising transition on the output clock. Observe that when the clock enable signal ENAO goes high or the RAM bit RCLK-ENAO is set to high, one input to the NAND gate 82 is high. If the inverted input clock signal is high (corresponding to a digital low original input clock signal), the output of the NAND gate 82 is a digital low value. In this case, the NOR gate 84 receives a digital high signal (the inverted input clock signal) and a digital low signal (the output of the NAND gate 82) to produce a digital low signal. If the inverted input clock signal is low (corresponding to a digital high original input clock signal), the output of the NAND gate 82 is a digital high value. Observe that in this case the logical OR gate 80 receives a digital low signal at both of its input nodes because of the digital low inverted input clock signal and the fact that the previously digital low enable signal ENAO resulted in a digital high output at the NAND gate 82, resulting in a digital low output from the inverter 86. In these circumstances, the NOR gate 84 once again receives a digital high signal (the output of the NAND gate 82) and a digital low signal (the inverted input clock signal) to produce a digital low signal.

Thus, it can be observed that although the enable signal is asserted, the output signal does not initially change, regardless of whether the enable signal was asserted during a digital high original input clock signal or a digital low original input clock signal. However, the output signal can change with the next digital high original input clock signal. Observe that when an enable signal is asserted (ENAO or RCKLENAO) one input to the NAND gate 82 is a digital high value. The other input to the NAND gate 82 is a digital high value during a digital high inverted input clock signal (corresponding to a digital low input clock signal). This forces the NAND gate 82 to generate a digital low value, which is inverted into a digital high value by inverter 86. The digital high value from inverter 86 is applied to one input of the NAND gate 82, the other input to the NAND gate 82 also has a digital high value from the enable signal (ENAO or RCKLENAO). Thus, once the output of the NAND gate 82 is low, it will remain low until both the ENAO and RCK-LENAO signals are low.

Thus, at this point, the output of the NAND gate 82 (an output toggle signal) is a digital low value. The NOR gate 84 will produce a digital high value only when both of its inputs are digitally low. Thus, when the next original input clock signal goes high, a digital low inverted input clock signal will result, thereby producing a digital high value at the output of the NOR gate 84.

Observe that a digital high output signal will not be generated when the enable signal (ENAO or RCLKENAO) is low because a low enable signal produces a digital high output at the NAND gate 82, which produces a digital low output at the NOR gate 84.

As indicated above, a rising transition of the ENO signal can never cause a rising transition of the CKLO signal. However, a falling transition of the ENAO signal can cause the CLKO signal to make a falling transition. However, since the registers in the logical array block are only triggered on a rising transition, this should not affect the behavior of the registers as long as the hold-time is met.

Thus, the circuit 88 provides an enable clock signal that can be applied to an entire logic array block. The circuit 89 operates in the same manner as the circuit 88, except that it processes a different input signal (LUTO_B) from the look-up table.

Figure 7:
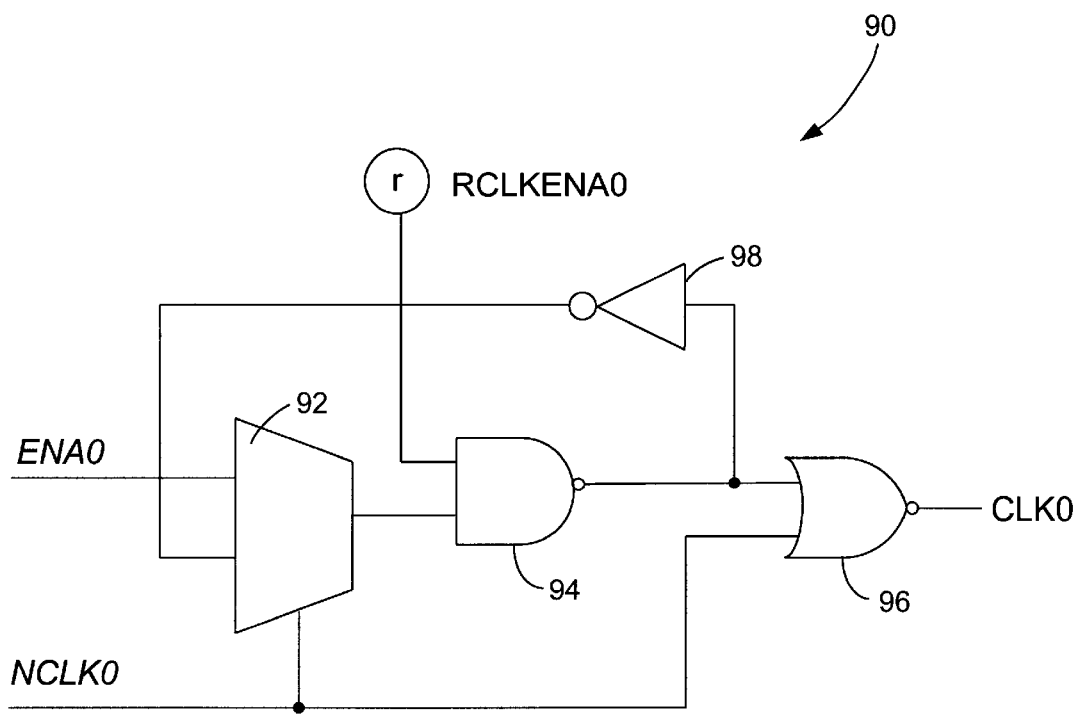
FIG. 7 illustrates an alternate clock latch which may be used in connection with the logic array block clock generation circuit of FIG. 6.

FIG. 7 illustrates an alternate embodiment of a clock latch circuit that may be used in accordance with a clock generation circuit 54 of the invention. The clock latch 90 of FIG. 7 may be substituted for the clock latch 76 of FIG. 6. The clock latch 90 is used when the hold-time of the ENO signal is an issue. The clock latch 90 reduces any possible hold-time problems.

In the clock latch 90, the enable signal is latched in the multiplexer 92 whenever the NCLKO signal is low and flows-through the multiplexer 92 whenever the NCLK signal is high. The output of the latch is combined with the RAM bit RCLKENAO signal at NAND gate 94. The output of the NAND gate 94 (an output toggle signal) is then applied to the NOR gate 96. The NOR gate 96 also receives the NCLKO signal to generate the output clock signal CLKO.

The behavior of this clock latch circuit differs from the clock latch circuit 76 of FIG. 6 in that a high-to-low transition of the ENAO signal will never cause a high-to-low transition of the CLKO signal. The CLKO signal will only make a low-to-high or high-to-low transition when the NCLKO signal makes a transition. The reason for this is that the NCLKO signal is used as the select line of the multiplexer 92, and therefore synchronizes the enable signal with the NCLK signal.

Figure 8:
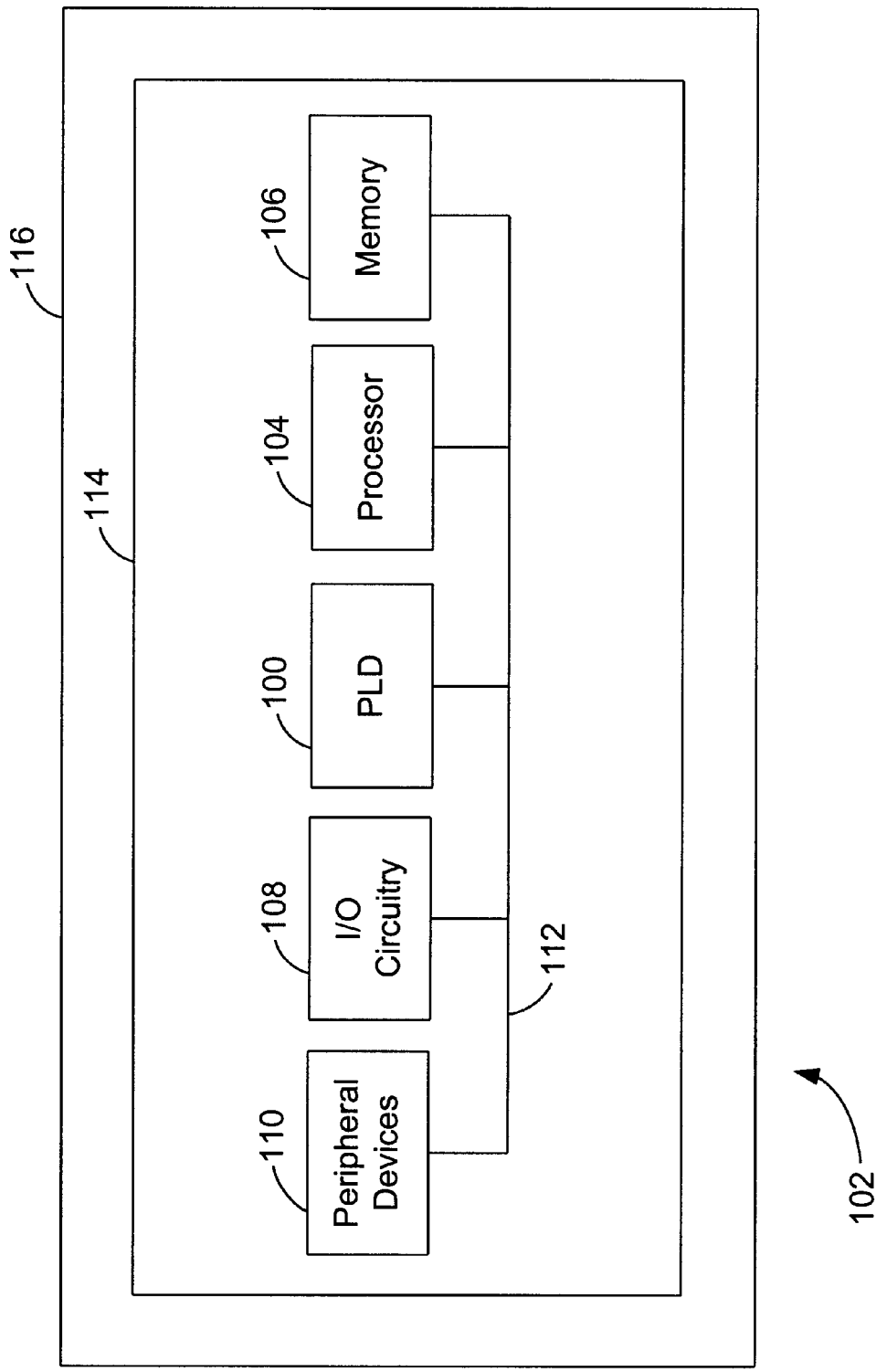
FIG. 8 illustrates a programmable logic device of the invention integrated into a larger digital system.

FIG. 8 illustrates a programmable logic device (PLD) 100 incorporating a logic element stack with a logic array block clock generation circuit in accordance with the invention. The PLD 100 forms a part of a data processing system 102. The data processing system 102 may include one or more of the following components: a processor 104, a memory 106, input/output circuitry 108, and peripheral devices 100. These components are coupled together by a system bus 112 and are populated on a circuit board 114, which is contained in an end-user system 116.

The system 102 can be used in a wide variety of applications, such as computer networking, data networking, instrumentation, video processing, digital signal processing, or any other application where the advantage of using reprogrammable logic is desirable. The PLD 100 can be used to perform a variety of logic functions. For example, the PLD 100 can be configured as a processor or controller that works in cooperation with processor 104. The PLD 100 may also be used as an arbiter for arbitrating access to a shared resource in the system 102. In yet another example, the PLD 100 can be configured as an interface between the processor 104 and one of the other components in the system 102.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A logic array block of a programmable logic device, comprising:
   a clock generation circuit including
      a clock generation circuit input node to receive a clock signal,
      an enable signal input node to receive an enable signal,
      a clock generation circuit output node, and
      a digital logic circuit connected between said clock generation circuit input node, said enable signal input node, and said clock generation circuit output node, said digital logic circuit selectively generating an enabled clock signal on said clock generation circuit output node by logically combining said clock signal and said enable signal, wherein said digital logic circuit is configured to initiate said enabled clock signal only after said enable signal has been asserted during a previous clock state of said clock signal; and
   a set of logic elements, each of said logic elements including a logic element clock input node connected to said clock generation circuit output node such that each logic element of said set of logic elements receives said enabled clock signal from said clock generation circuit.

2. The apparatus of claim 1 wherein said digital logic circuit terminates said enabled clock signal when said enable signal changes state.

3. The apparatus of claim 1 wherein said digital logic circuit terminates said enabled clock signal in response to a selected signal transition of said clock signal.

4. The apparatus of claim 1 wherein said digital logic circuit includes a clock latch circuit to process said clock signal and said enable signal.

5. The apparatus of claim 4 wherein said clock latch circuit includes a logical NAND gate with a logical NAND gate input node to receive said enable signal and a logical NAND gate output node to selectively carry an output toggle signal.

6. The apparatus of claim 5 wherein said clock latch circuit includes a logical NOR gate with a first logical NOR gate input node connected to said logical NAND gate output node, a second logical NOR gate input node to receive said clock signal, and a logical NOR gate output node to generate an enabled clock signal in response to said output toggle signal from said logical NAND gate output node and said clock signal.

7. The apparatus of claim 6 further comprising a clock latch multiplexer with a clock latch multiplexer input node to receive said enable signal, a clock latch multiplexer signal select node to receive said clock signal, and a clock latch multiplexer output node to route said output toggle signal to said first logical NOR gate input node.

8. The apparatus of claim 7 further comprising an inverter positioned between said logical NAND gate output node and an input node of said clock latch multiplexer.

9. The apparatus of claim 5 wherein said clock latch circuit includes a first logical OR gate connected to said logical NAND gate input node and a second logical OR gate connected to a second logical NAND gate input node.

10. The apparatus of claim 9 wherein said first logical OR gate includes a first input node to receive said enable signal and a second input node to receive a supplemental enable signal.

11. The apparatus of claim 9 wherein said second logical OR gate includes a first input node to receive said clock signal and a second input node to receive an inverted signal from said logical NAND gate output node.

12. The apparatus of claim 1 wherein said clock generation circuit includes a plurality of clock generation circuit input nodes to receive a plurality of clock signals; and a plurality of clock generation circuit output nodes, said clock generation circuit generating an enabled output signal on a selected clock generation circuit output node of said plurality of clock generation circuit output nodes.

13. The apparatus of claim 1 wherein said clock generation circuit further comprises a clear signal processing circuit to process a clear signal.

14. The apparatus of claim 1 further comprising:

a system bus connected to said field programmable logic device; and a plurality of data processing elements connected to said system bus.

15. The apparatus of claim 14 wherein said plurality of data processing elements include a processor and input/output circuitry.

16. The apparatus of claim 15 wherein said plurality of data processing elements include peripheral devices and a memory.

17. A method of applying a global enabled clock signal to a set of logic elements of a logic array block of a programmable logic device, said method comprising the steps of:

combining a clock signal with an enable signal to initiate an enabled clock signal only after said enable signal has been asserted during a previous clock state of said clock signal; and routing said enabled clock signal to a set of logic elements of a logic array block of a programmable logic device such that said set of logic elements are controlled by said enabled clock signal.

18. The method of claim 17 wherein said combining step includes the step of terminating said enabled clock signal in response to a change in state of said enable signal.

19. The method of claim 17 wherein said combining step includes the step of terminating said enabled clock signal in response to a selected signal transition of said clock signal.

\* \* \* \* \*